(12) United States Patent
Kintoki et al.

(10) Patent No.: US 12,358,057 B2
(45) Date of Patent: Jul. 15, 2025

(54) JAW EXCHANGER AND MACHINE TOOL

(71) Applicant: Yamazaki Mazak Corporation, Niwa-gun (JP)

(72) Inventors: Tomohiro Kintoki, Niwa-gun (JP); Tetsuya Ito, Niwa-gun (JP); Yuki Mori, Niwa-gun (JP); Yuki Myoren, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 231 days.

(21) Appl. No.: 17/679,101

(22) Filed: Feb. 24, 2022

(65) Prior Publication Data
US 2022/0388076 A1    Dec. 8, 2022

Related U.S. Application Data

(63) Continuation of application No. PCT/JP2019/033836, filed on Aug. 29, 2019.

(51) Int. Cl.
  *B23B 31/39*    (2006.01)
  *B23B 25/04*    (2006.01)
  (Continued)

(52) U.S. Cl.
  CPC .......... *B23B 31/39* (2013.01); *B23Q 11/0891* (2013.01); *B23B 25/04* (2013.01); *B23Q 2003/15537* (2016.11); *B23Q 11/0032* (2013.01); *Y10S 279/901* (2013.01); *Y10T 483/115* (2015.01); *Y10T 483/171* (2015.01); *Y10T 483/1827* (2015.01)

(58) Field of Classification Search
  CPC ..... Y10T 483/171; B23B 31/39; B23B 25/04; Y10S 279/901; Y10S 901/01; B23Q 11/08–11/0891; B23Q 2003/15537; B25J 9/162
  USPC ................................ 483/20; 279/901; 901/1
  See application file for complete search history.

(56) References Cited

U.S. PATENT DOCUMENTS 4,008,515 A   2/1977   Hague et al.
4,532,692 A   8/1985   Miyachi
(Continued)

FOREIGN PATENT DOCUMENTS

CN   101444848   6/2009
DE   2610389     9/1977
(Continued)

OTHER PUBLICATIONS

Machine Translation of JP 2017-052054-A, which JP '054 was published Mar. 16, 2017.*
(Continued)

*Primary Examiner* — Erica E Cadugan
(74) *Attorney, Agent, or Firm* — MORI & WARD, LLP

(57) ABSTRACT

A jaw exchanger includes a stocker configured to store jaws which are configured to be attached to a chuck body of a machine tool, a stocker movement mechanism configured to move the stocker between a first position and a second position, and a jaw transferor configured to transfer the jaws to the stocker positioned at the first position from a jaw receiver to receive the jaws, and configured to transfer the jaws to the chuck body from the stocker positioned at the second position. The chuck body is rotatable about a rotation axis.

20 Claims, 12 Drawing Sheets

(51) Int. Cl.
    *B23Q 11/08*     (2006.01)
    *B23Q 3/155*     (2006.01)
    *B23Q 11/00*     (2006.01)

(56) References Cited

U.S. PATENT DOCUMENTS

| | | |
|---|---|---|
| 5,033,183 A | 7/1991 | Morisaki |
| 5,254,068 A | 10/1993 | Yamada et al. |
| 2009/0143206 A1 | 6/2009 | Terazono et al. |
| 2011/0115171 A1 | 5/2011 | Van de Vosse et al. |
| 2013/0183751 A1 | 7/2013 | Kobayashi et al. |

FOREIGN PATENT DOCUMENTS

| | | | |
|---|---|---|---|
| DE | 3827316 C1 | * | 10/1989 |
| EP | 0532372 | | 3/1993 |
| JP | 59-201703 | | 11/1984 |
| JP | 61-071905 | | 4/1986 |
| JP | 63-77605 | | 4/1988 |
| JP | H02-262906 | | 10/1990 |
| JP | 04-105801 | | 4/1992 |
| JP | 05-75522 | | 10/1993 |
| JP | 5-253711 | | 10/1993 |
| JP | 2002-166384 | | 6/2002 |
| JP | 2017-052054 A | * | 3/2017 |

OTHER PUBLICATIONS

Chinese Office Action for corresponding CN Application No. 201980099532.6, Jun. 13, 2022.
Supplementary European Search Report for corresponding EP Application No. 19943196.6-1103, Jul. 28, 2022.
European Office Action for corresponding EP Application No. 19943196.6-1103, Aug. 9, 2022.
The International Preliminary Report on Patentability (Chapter I) with translation of Written Opinion for corresponding International Application No. PCT/JP2019/033836, Mar. 1, 2022.
Chinese Office Action for corresponding CN Application No. 201980099532.6, Dec. 8, 2022.
European Office Action for corresponding EP Application No. 19943196.6-1103, Feb. 15, 2023.
International Search Report for corresponding International Application No. PCT/JP2019/033836, Nov. 12, 2019.
Written Opinion for corresponding International Application No. PCT/JP2019/033836, Nov. 12, 2019.
Japanese Office Action for corresponding JP Application No. 2019-564110, Jan. 30, 2020 (w/ English machine translation).

* cited by examiner 100A,100

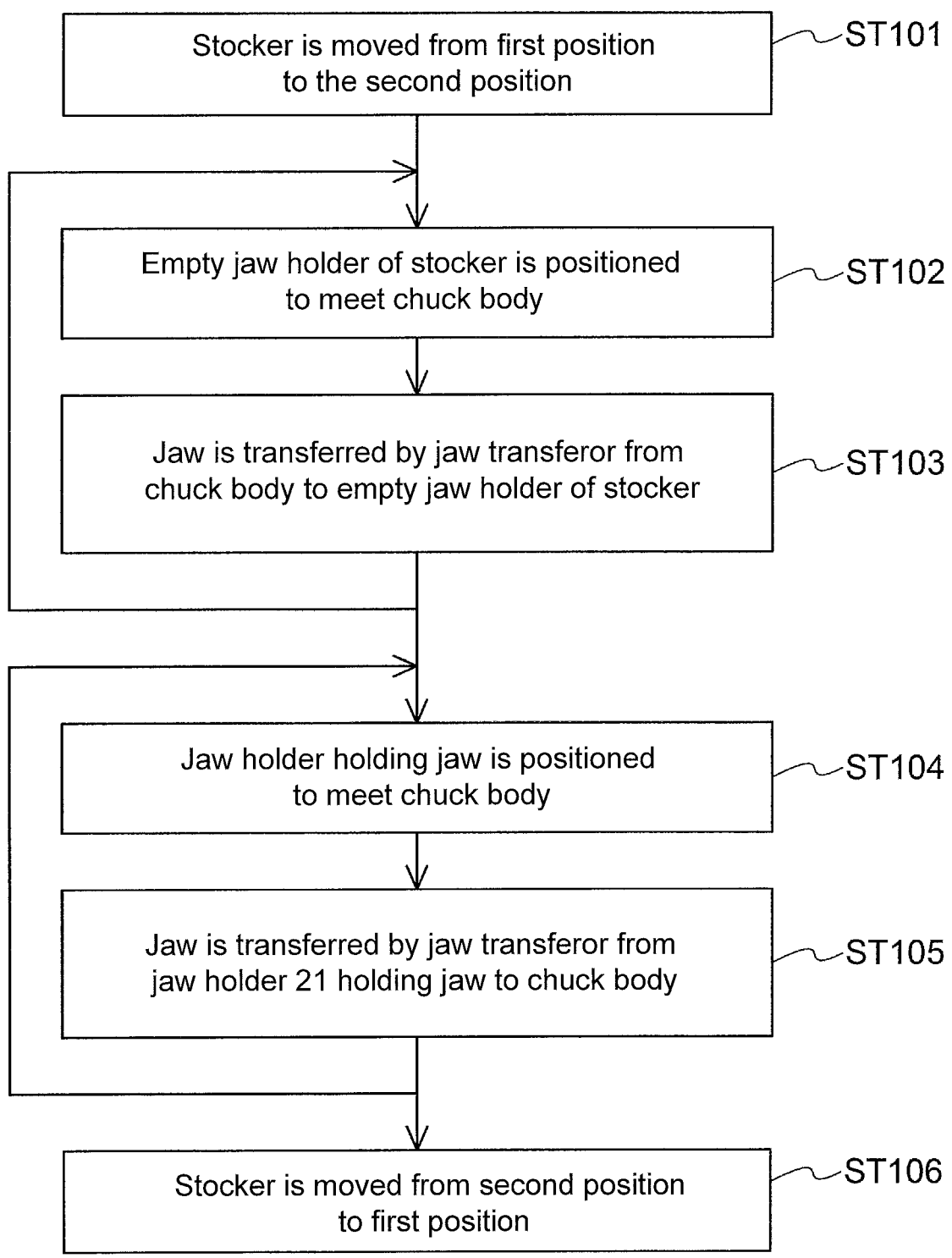

JAW EXCHANGER AND MACHINE TOOL

CROSS-REFERENCE TO RELATED APPLICATIONS

The present application is a continuation application of International Application No. PCT/JP2019/033836, filed Aug. 29, 2019. The contents of this application are incorporated herein by reference in their entirety.

BACKGROUND OF THE INVENTION

Field of the Invention

The present invention relates to a jaw exchanger and a machine tool.

Discussion of the Background

A machine tool including a magazine that stores a plurality of jaws (grippers) is known.

JP5-75522B2 describes a gripper storage magazine of a chuck gripper automatic exchanger. The gripper storage magazine shown in JP5-75522B2 is fixed to a slide base and is movable in front and rear directions together with the slide base. The slide base is fixed to a headstock via a fixed base. When the gripper storage magazine is at a forward position, a gripper stored in the gripper storage magazine and a gripper attached to a chuck body are exchanged with each other.

SUMMARY OF THE INVENTION

According to one embodiment of the present invention, a jaw exchanger includes a stocker configured to store jaws which are configured to be attached to a chuck body of a machine tool, a stocker movement mechanism configured to move the stocker between a first position and a second position, and a jaw transferor configured to transfer the jaws to the stocker positioned at the first position from a jaw receiver to receive the jaws, and configured to transfer the jaws to the chuck body from the stocker positioned at the second position. The chuck body is rotatable about a rotation axis.

According to another embodiment of the present invention, a machine tool includes a chuck body configured to hold a workpiece via jaws, a support member rotatably supporting the chuck body, a jaw exchanger, and a controller configured to control the jaw exchanger. The jaw exchanger includes a jaw receiver configured to receive the jaws, a stocker which is configured to store the jaws, a stocker movement mechanism configured to move the stocker between a first position and a second position, and a jaw transferor configured to transfer the jaws from the jaw receiver to the stocker positioned at the first position and to transfer the jaws to the chuck body from the stocker positioned at the second position.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 12 is a flowchart of an example jaw exchanging method.

DESCRIPTION OF THE EMBODIMENTS

Figure 1:
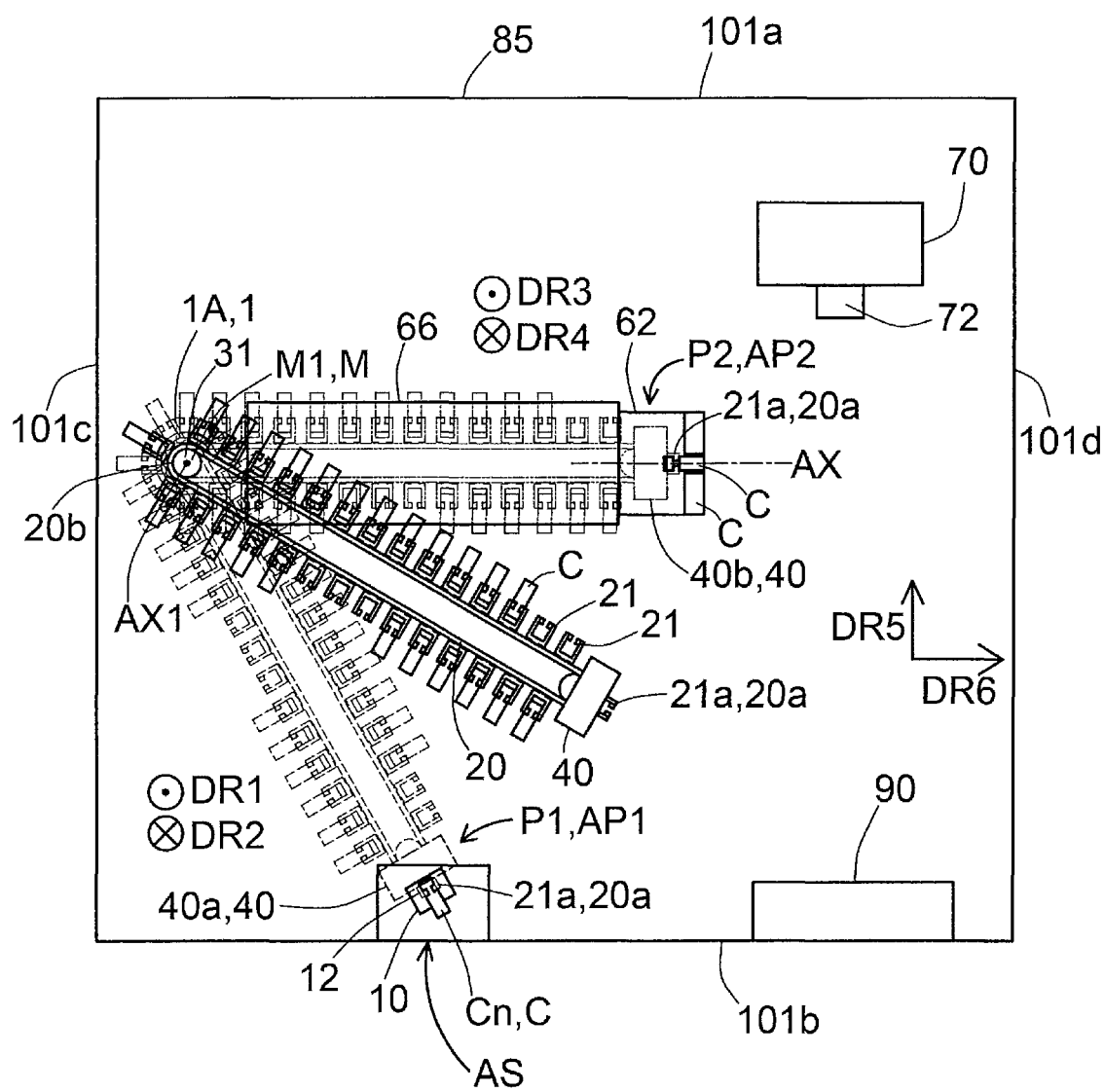
FIG. 1 is a schematic plan view of a jaw exchanger and a machine tool according to a first embodiment, schematically illustrating an example arrangement of the jaw exchanger and the machine tool.

By referring to the accompanying drawings, a jaw exchanger 1 and a machine tool 100 according to some embodiments of the present invention will be described. It is noted that in the following description of the embodiments, identical reference numerals are used to denote identical portions, members, or components having identical functions, and redundant description of identical portions, members, or components will be eliminated or minimized.

Definitions of Directions and Terms

As used herein, the term "first position P1" (or first stocker position) refers to a position where a stocker 20 is able to receive a jaw C from a jaw receiver 10 or a position where the jaw C can be retrieved to the jaw receiver 10 from the stocker 20. Also as used herein, the term "second position P2" (or second stocker position) refers to a position where the stocker 20 is able to receive the jaw C from a chuck body 62 or a position where the stocker 20 is able to supply the jaw C to the chuck body 62.

In this specification, the direction from the jaw receiver 10 toward the stocker 20 (more specifically, a jaw receiving member 21a of the stocker 20) provided at the first position P1 is defined as "first direction DR1". For example, the first direction DR1 is a direction parallel to a vertical direction. Also, the direction opposite to the first direction DR1 is defined as "second direction DR2".

In this specification, the direction from the chuck body 62 toward the stocker 20 (more specifically, the jaw receiving member 21a of the stocker 20) provided at the second position P2 is defined as "third direction DR3". For example, the third direction DR3 is a direction parallel to the vertical direction. For example, the third direction DR3 is parallel to the first direction DR1. Also, the direction opposite to the third direction DR3 is defined as "fourth direction DR4".

In this specification, the direction from the jaw receiver 10 toward a center portion of the machine tool 100 is defined as "fifth direction DR5". For example, the fifth direction DR5 is the direction from a housing 85 of the machine tool 100 (or the front surface, 101b, of the machine tool 100) toward the center portion of the machine tool 100.

In this specification, the direction from a first side surface 101c toward a second side surface 101d of the machine tool 100 is defined as "sixth direction DR6". For example, the sixth direction DR6 corresponds to a lateral direction.

In this specification, the chuck body 62 refers to a member that holds an object (more specifically, a workpiece, which is a to-be-machined object) via the jaw C. A jaw may also be referred to as a Japanese equivalent of "gripper". In this specification, a jaw stored in the stocker 20 via the jaw receiver 10 will be referred to as "jaw Cn", and a jaw that is not a jaw Cn will be referred to as "jaw C".

In this specification, the machine tool 100 refers to any machine capable of machining a workpiece, which is a to-be-machined object. For example, the machine tool is a machine capable of cutting, machining, and/or grinding a metal. In this specification, the machine tool may be a combined multi-functional machine tool (for example, a multi-tasking lathe), which is capable of performing a plurality of different kinds of machining. Also in this specification, the machine tool may be a lathe (such as a turret lathe, a comb-blade lathe, a horizontal lathe, and a vertical lathe).

First Embodiment

By referring to FIG. 1, a jaw exchanger 1A and a machine tool 100A according to the first embodiment will be described. FIG. 1 is a schematic plan view of the jaw exchanger 1A and the machine tool 100A according to the first embodiment, schematically illustrating an example arrangement of the jaw exchanger 1A and the machine tool 100A. It is to be noted that in FIG. 1, some elements of the machine tool 100A (for example, an apex portion of the housing 85) are omitted.

The jaw exchanger 1A according to the first embodiment includes the stocker 20, a stocker movement mechanism (or stocker mover) M, and a jaw transferor 40.

The jaw exchanger 1A is a device capable of exchanging the jaw C held by the chuck body 62 for another jaw. The chuck body 62 holds a workpiece (in other words, to-be-worked object) via the jaw C. Also, the chuck body 62 is rotatable about the rotation axis AX.

By making the chuck body 62 rotate about the rotation axis AX, workpieces held by a plurality of jaws C are made to rotate about the rotation axis AX. While being made to rotate about the rotation axis AX, the workpiece is machined by a tool 72 attached to a machining apparatus (or machiner) 70. In the example illustrated in FIG. 1, the rotation axis AX is parallel to the sixth direction DR6.

The stocker 20 is a device capable of storing jaws C. Preferably, the stocker 20 includes jaw holders 21, each of which is capable of holding a jaw C. In the example illustrated in FIG. 1, the stocker 20 includes a plurality of jaw holders 21. The plurality of jaw holders 21 are capable of holding a plurality of jaws C. In other words, the stocker 20 is capable of storing a plurality of jaws C via the plurality of jaw holders 21.

In the example illustrated in FIG. 1, a new jaw Cn can be stored in the stocker 20 via the jaw transferor 40. This configuration will be described in detail later.

The stocker movement mechanism M moves the stocker 20 between the first position P1 (see the broken lines illustrated in FIG. 1) and the second position P2 (see the double-dashed lines illustrated in FIG. 1). The stocker movement mechanism M includes a driver 31, which moves the stocker 20. The driver 31 may be a motor or an actuator (for example, a hydraulic actuator).

The first position P1 corresponds to: a jaw receiving position, where the stocker 20 receives a jaw Cn from the jaw receiver 10; or a jaw pick-out position, where a jaw C is picked out from the stocker 20 to the jaw receiver 10.

The second position P2 corresponds to a jaw exchange position. More specifically, the second position P2 corresponds to a position where the jaw C attached to the chuck body 62 is retrieved to the stocker 20. The second position P2 also corresponds to a position where a jaw C stored in the stocker 20 is supplied to the chuck body 62.

In the example illustrated in FIG. 1, the stocker 20 includes the jaw receiving member 21a. An example of the jaw receiving member 21a is a jaw holder 21 positioned at a first end portion 20a of the stocker 20.

The jaw transferor 40 transfers a jaw Cn from the jaw receiver 10 to the stocker 20 provided at the first position P1 (more specifically, the jaw receiving member 21a of the stocker 20 provided at the first position P1). The transfer of the jaw Cn from the jaw receiver 10 to the jaw receiving member 21a is performed by, for example, the jaw transferor 40 pulling the jaw Cn upward.

The jaw transferor 40 transfers the jaw C to the chuck body 62 from the stocker 20 provided at the second position P2. In the example illustrated in FIG. 1 (see the two-dot chain lines illustrated in FIG. 1), the jaw transferor 40 transfers the jaw C to the chuck body 62 from the jaw holder 21 positioned at the first end portion 20a of the stocker 20. The transfer of this jaw C is performed by, for example, the jaw transferor 40 pushing the jaw C downward.

In the jaw exchanger 1A according to the first embodiment, the stocker 20 is movable to the jaw receiving position (the first position P1). Also, the jaw transferor 40 is capable of transferring the jaw Cn from the jaw receiver 10 to the stocker 20 provided at the first position P1. This ensures that a worker (or robot) only has to place the jaw Cn at the jaw receiver 10 in order to store the jaw Cn in the stocker 20. In other words, the first embodiment makes easier the work of storing the jaw Cn in the stocker 20.

In the first embodiment, the jaw exchanger 1A may include the jaw receiver 10 (jaw receiver), which receives a jaw Cn.

The jaw receiver 10 is provided at a position where the jaw receiver 10 is able to receive a jaw Cn from outside the machine tool 100A. The jaw Cn is supplied to the jaw receiver 10 from outside the machine tool 100A by, for example, a worker or a robot.

In the example illustrated in FIG. 1, the jaw receiver 10 includes a holder 12, which is capable of holding a jaw Cn. In this case, a worker or a robot may supply, from outside the machine tool 100A, a jaw Cn the holder 12 of the jaw receiver 10.

In the example illustrated in FIG. 1, a jaw Cn can be stored in the stocker 20 via the jaw receiver 10 and the jaw transferor 40. This configuration eliminates the need for the worker entering the machine tool 100A (more specifically, entering the housing 85) at the time of storing the jaw Cn in the stocker 20. Thus, the first embodiment eliminates the need for stopping the operation of the machine tool 100A (for example, the rotational driving of the chuck body 62 and/or the driving of the machining apparatus 70) at the time of storing the jaw Cn in the stocker 20.

It is to be noted, however, that the first embodiment does not exclude any configuration in which a jaw Cn is stored in the stocker 20 without intervention by the jaw receiver 10 and the jaw transferor 40. In other words, the worker may enter the machine tool 100A with the operation of the machine tool 100A stopped. Inside the machine tool 100A, the worker may store a jaw Cn in the stocker 20 by a method similar to conventional practice.

In the example illustrated in FIG. 1 (see the broken lines illustrated in FIG. 1), the jaw receiver 10 and the stocker 20 provided at the first position P1 (more specifically, the jaw receiving member 21a or the first end portion 20a of the stocker 20) are arranged along the first direction DR1 (more specifically, along a vertical direction). This configuration ensures that the jaw transferor 40 only has to move the jaw Cn along the first direction DR1 (more specifically, the upward direction) in order to transfer the jaw Cn from the jaw receiver 10 to the stocker 20. Thus, the example illustrated in FIG. 1 ensures that the jaw Cn is transferred from the jaw receiver 10 to the stocker 20 in a short period of time.

In the example illustrated in FIG. 1, while the machining apparatus 70 is machining a workpiece, the stocker 20 can be maintained at the first position P1 (see the broken lines illustrated in FIG. 1). This configuration ensures that even during machining of a workpiece, the jaw Cn is transferred to (in other words, stored in) the stocker 20 from the jaw receiver 10 in a short period of time.

The jaw transferor 40 only has to move a jaw C in the second direction DR2 (more specifically, the downward direction) in order to pick out the jaw C from the stocker 20 to the jaw receiver 10. Thus, in the example illustrated in FIG. 1, a jaw C is picked out from the stocker 20 to the jaw receiver 10 in a short period of time.

The machine tool 100A according to the first embodiment includes: the jaw exchanger 1A; the chuck body 62, which holds a workpiece via the jaw C; a support member 66, which rotatably supports the chuck body 62; the machining apparatus 70, to which the tool 72 is attached; and a controller 90. The machine tool 100A may include the housing 85 (the housing 85 surrounds the jaw exchanger 1A, the chuck body 62, the support member 66, and the machining apparatus 70).

From the viewpoint of making easier the work of placing a jaw Cn at the jaw receiver 10, the jaw receiver 10 is preferably provided near the housing 85 (for example, at a distance of 50 cm or shorter from the housing 85 or at a distance of 30 cm or shorter from the housing 85). Alternatively or additionally, the jaw receiver 10 is preferably provided at a position where the jaw receiver 10 is accessible through an access opening AS, which is provided on the housing 85 (for example, the jaw receiver 10 is preferably provided within reach from the access opening AS).

In the example illustrated in FIG. 1, the jaw receiver 10 is provided near the housing 85 or near the access opening AS, which is provided on the housing 85. This configuration enables a worker (or robot) to easily place a jaw Cn at the jaw receiver 10.

From the viewpoint of making easier the work of placing a jaw Cn at the jaw receiver 10, the jaw receiver 10 is preferably provided in a region in which the front surface 101b of the machine tool 100A is provided. Alternatively or additionally, the access opening AS is preferably provided on the front surface 101b of the housing 85. The configuration in which the access opening AS, through which the jaw receiver 10 is accessed, is provided on the front surface 101b of the machine tool 100A enables the worker to be situated at the worker's normal work position when placing a jaw Cn at the jaw receiver 10. In other words, in order to store the jaw Cn, it is not necessary for the worker to move from the front surface 101b of the machine tool 100A to the rear surface, 101a, of the machine tool (or to a side surface of the machine tool 100A or to the inside of the machine tool 100A).

In the example illustrated in FIG. 1, the jaw transferor 40 is movable together with the stocker 20. More specifically, the jaw transferor 40 is mounted on the stocker 20. This configuration ensures that a jaw Cn can be transferred from the jaw receiver 10 to the stocker 20 and a jaw C can be transferred from the stocker 20 to the chuck body 62 using a single jaw transferor 40. In other words, the single jaw transferor 40 can be located at: a first jaw transferor position 40a, at which the jaw transferor 40 transfers a jaw Cn from the jaw receiver 10 to the stocker 20 provided at the first position P1; and a second jaw transferor position 40b, at which the jaw transferor 40 transfers a jaw C to the chuck body 62 from the stocker 20 provided at the second position P2.

In the configuration in which the jaw transferor 40 is movable together with the stocker 20, a smaller number of jaw transferors 40 are necessary to be provided in the jaw exchanger 1A. In the configuration in which the jaw transferor 40 is mounted on when the stocker 20, it is not necessary to perform positioning of the stocker 20 and the jaw transferor 40 relative to each other every time the stocker 20 is moved.

In the example illustrated in FIG. 1, the stocker 20 is provided above the support member 66, which rotatably supports the chuck body 62. In other words, in the example illustrated in FIG. 1, the stocker 20 is provided in the space over the support member 66. This configuration ensures that the space over the support member 66 is effectively used, resulting in a compact configuration of the machine tool 100A.

In the example illustrated in FIG. 1 (see the two-dot chain lines illustrated in FIG. 1), when the stocker 20 is provided at the second position P2, the jaw receiving member 21a of the stocker 20 or the first end portion 20a of the stocker 20 overlap the chuck body 62 in plan view.

When the stocker 20 is provided at the first position P1, the jaw receiving member 21a of the stocker 20 or the first end portion 20a of the stocker 20 does not overlap the chuck body 62 and the support member 66 in plan view (the jaw receiving member 21a or the first end portion 20a is provided at a non-overlapping position). In this case, the chuck body 62 and the support member 66 do not become obstacles to the transfer of a jaw Cn from the jaw receiver 10 to the stocker 20.

In the example illustrated in FIG. 1, the stocker movement mechanism M includes a first movement mechanism (or first mover) M1 (an example of which is the driver 31, which is a motor or an actuator). The first movement mechanism M1 swings the stocker 20 between a first angle position AP1 and a second angle position AP2. An example of the first angle position AP1 is an angle position where the longitudinal direction of the stocker 20 is inclined relative to the rotation axis AX of the chuck body 62. The second angle position AP2 is an angle position where the longitudinal direction of the stocker 20 is parallel to the rotation axis AX of the chuck body 62. In the example illustrated in FIG. 1, the first angle position AP1 corresponds to the first position P1, and the second angle position AP2 corresponds to the second position P2.

In the configuration in which the stocker 20 is swingable about a swing axis AX1, the amount of displacement of the first end portion 20a of the stocker 20 is larger than the amount of displacement of a portion of the stocker 20 closer to the swing axis AX1 (for example, a second end portion 20b of the stocker 20). This configuration enables the first end portion 20a to take a larger movement stroke (in other words, the jaw receiving member 21a takes a larger movement stroke) while ensuring that the stocker 20 moves in a smaller volume of space.

Second Embodiment

Figure 2:
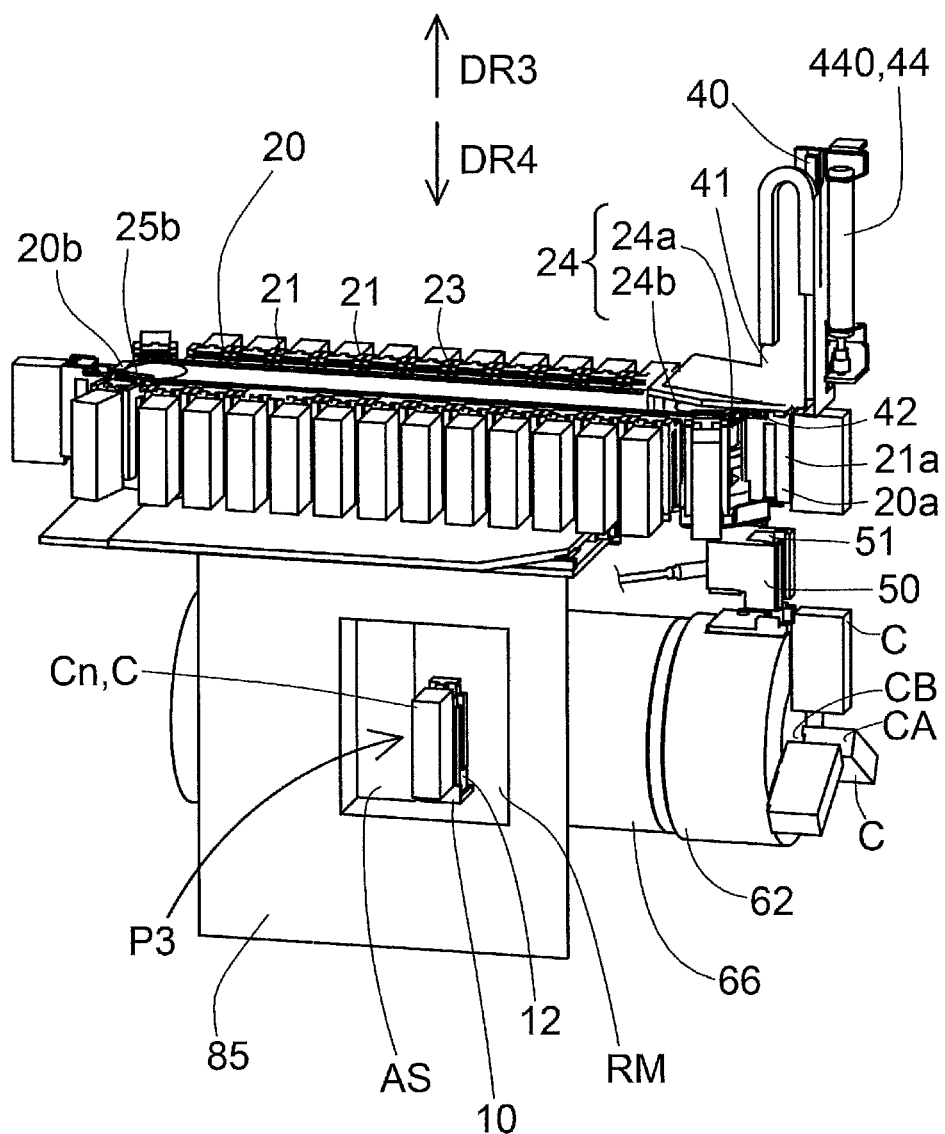
FIG. 2 is a schematic perspective view of a jaw exchanger according to a second embodiment, schematically illustrating the jaw exchanger.
Figure 3:
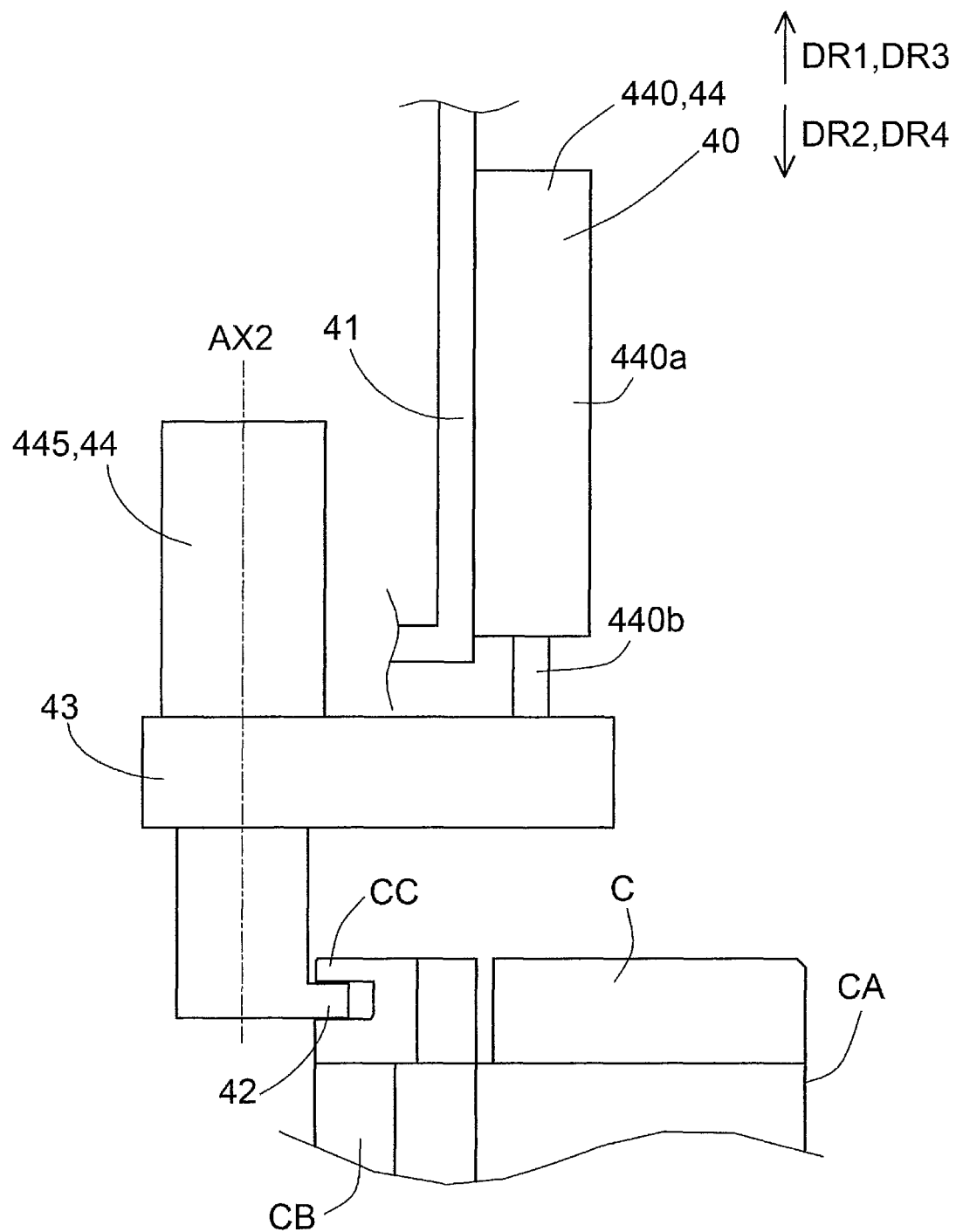
FIG. 3 is a schematic enlarged front view of the jaw exchanger in which the jaw exchanger is partially enlarged.
Figure 4:
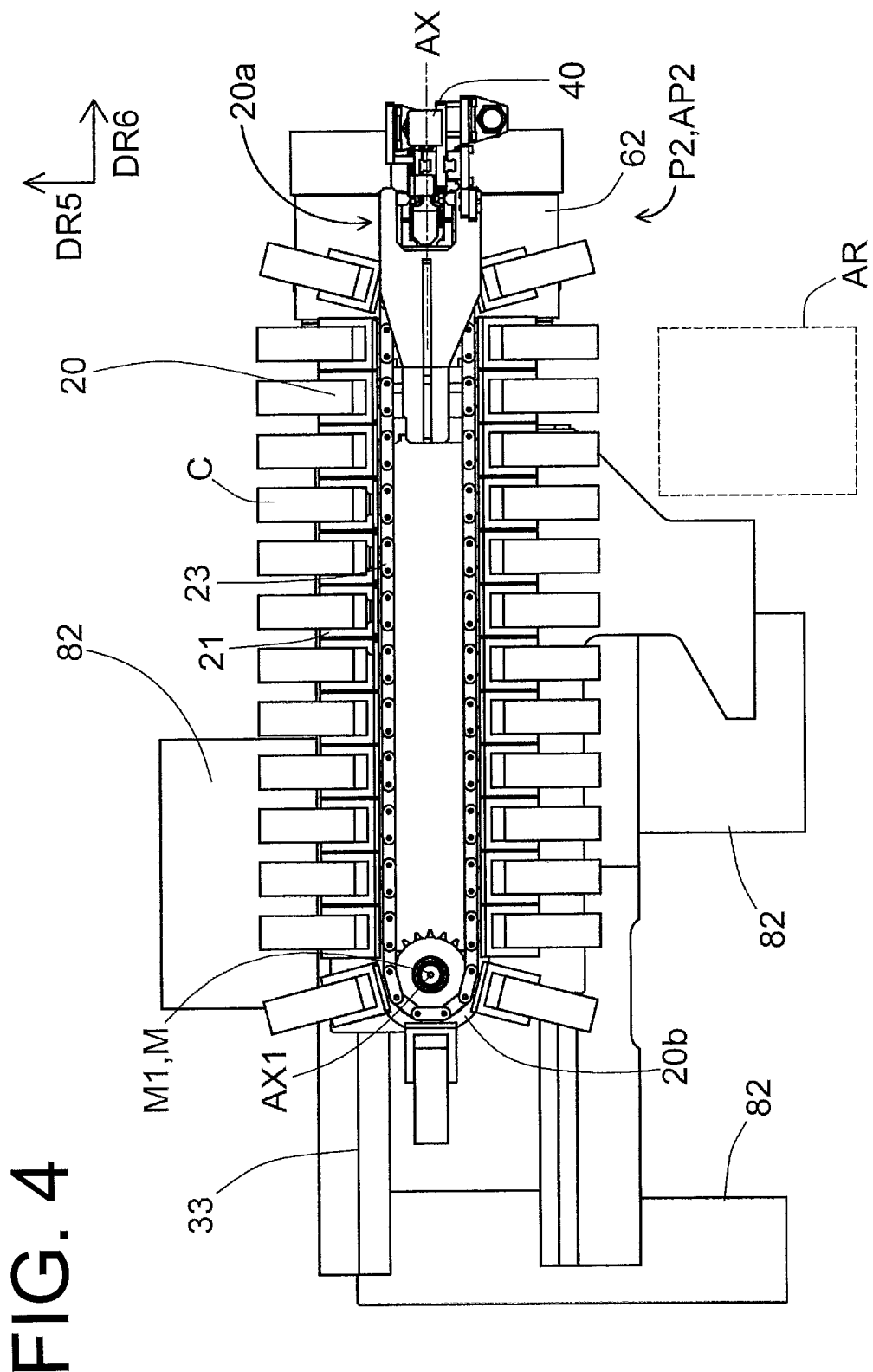
FIG. 4 is a schematic plan view of the jaw exchanger according to the second embodiment, schematically illustrating the jaw exchanger.
Figure 5:
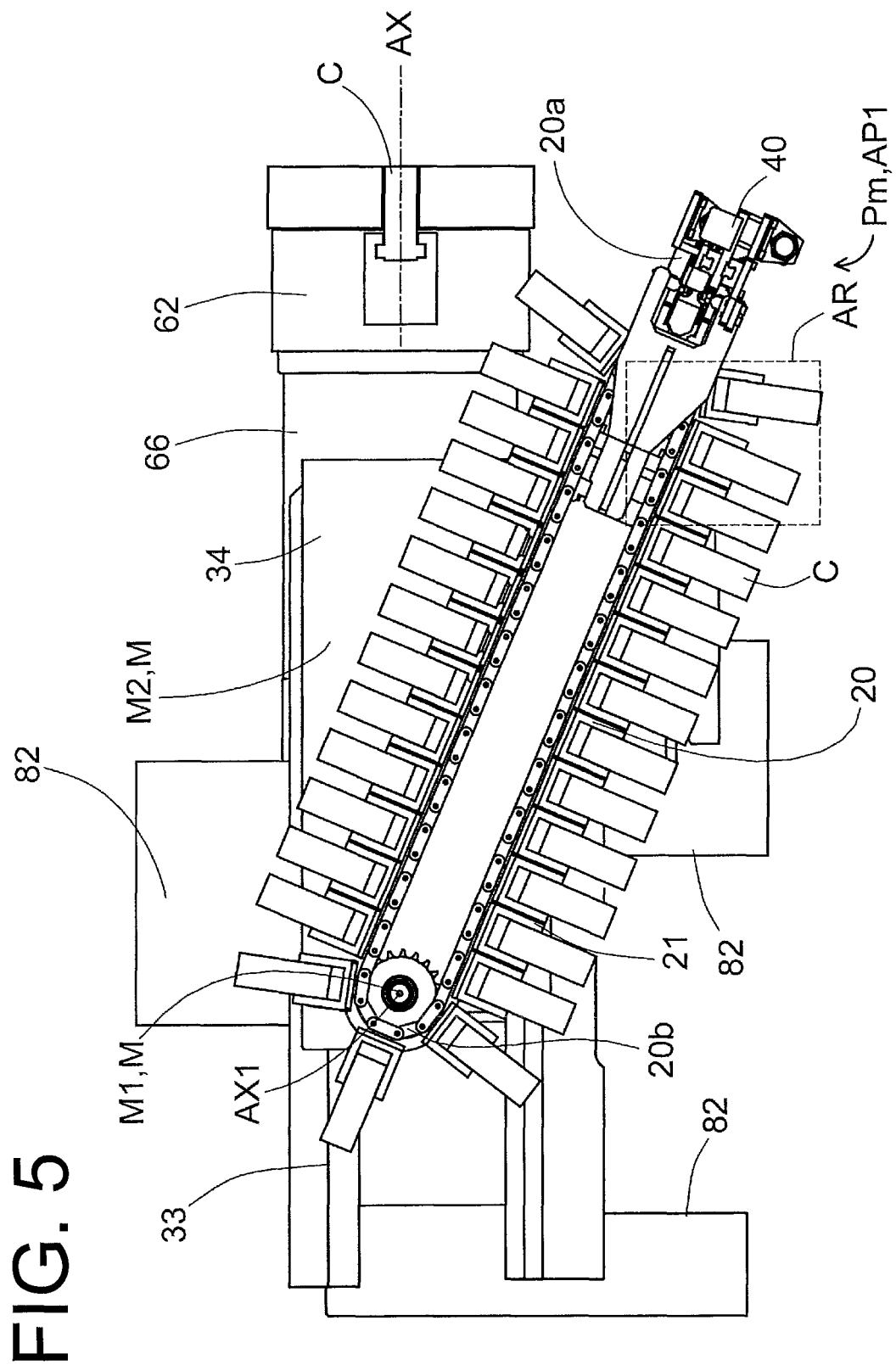
FIG. 5 is a schematic plan view of the jaw exchanger according to the second embodiment, schematically illustrating the jaw exchanger.
Figure 6:
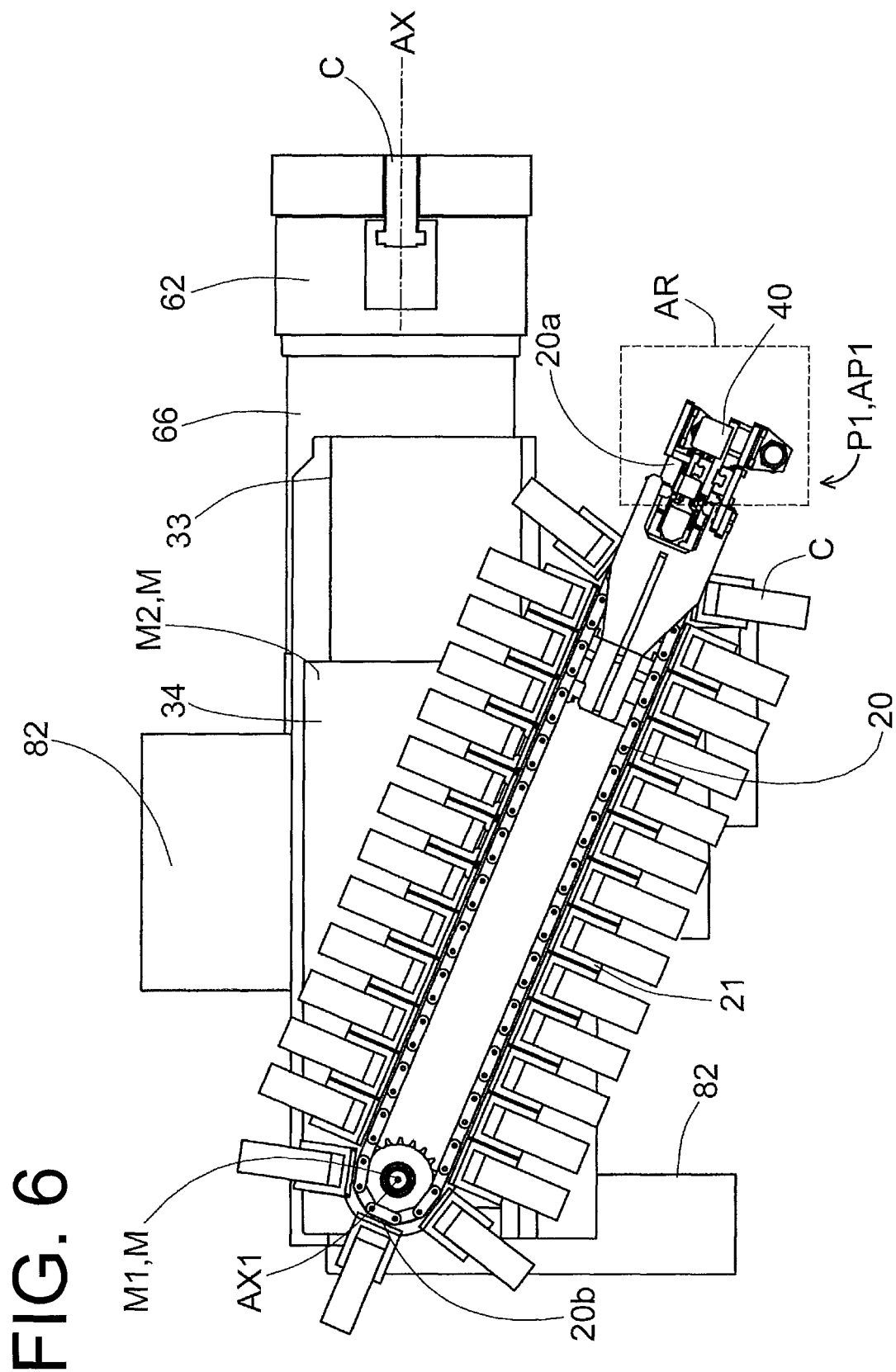
FIG. 6 is a schematic plan view of the jaw exchanger according to the second embodiment, schematically illustrating the jaw exchanger.
Figure 7:
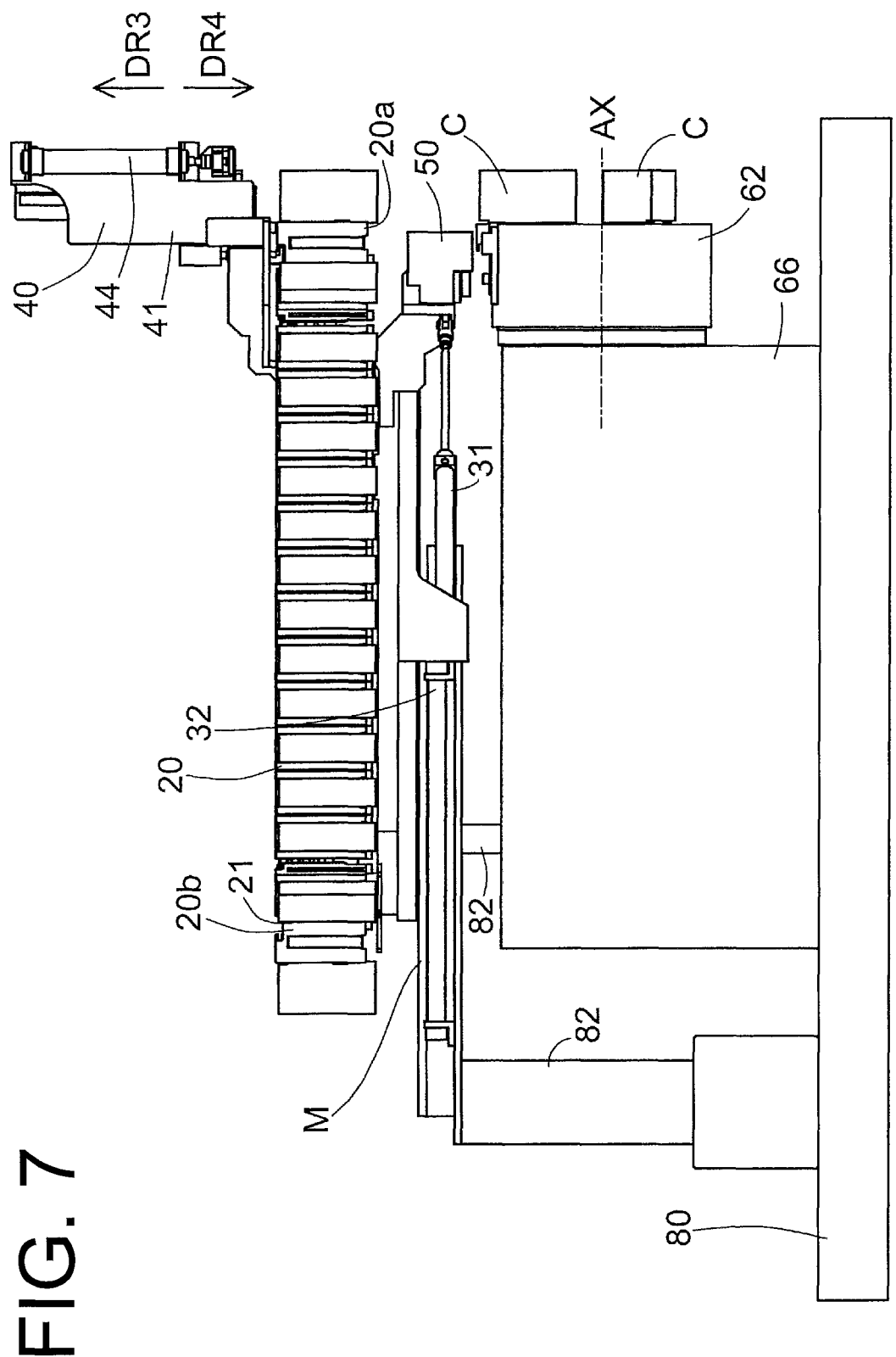
FIG. 7 is a schematic front view of the jaw exchanger according to the second embodiment, schematically illustrating the jaw exchanger.
Figure 8:
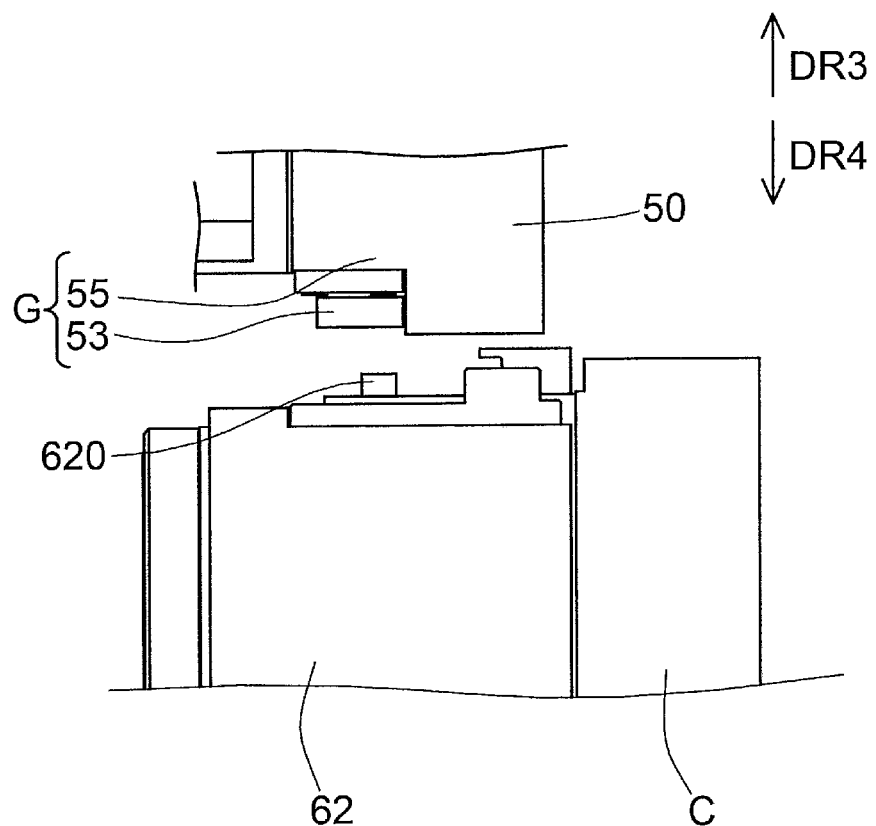
FIG. 8 is a schematic enlarged front view of the jaw exchanger in which the jaw exchanger is partially enlarged.
Figure 9:
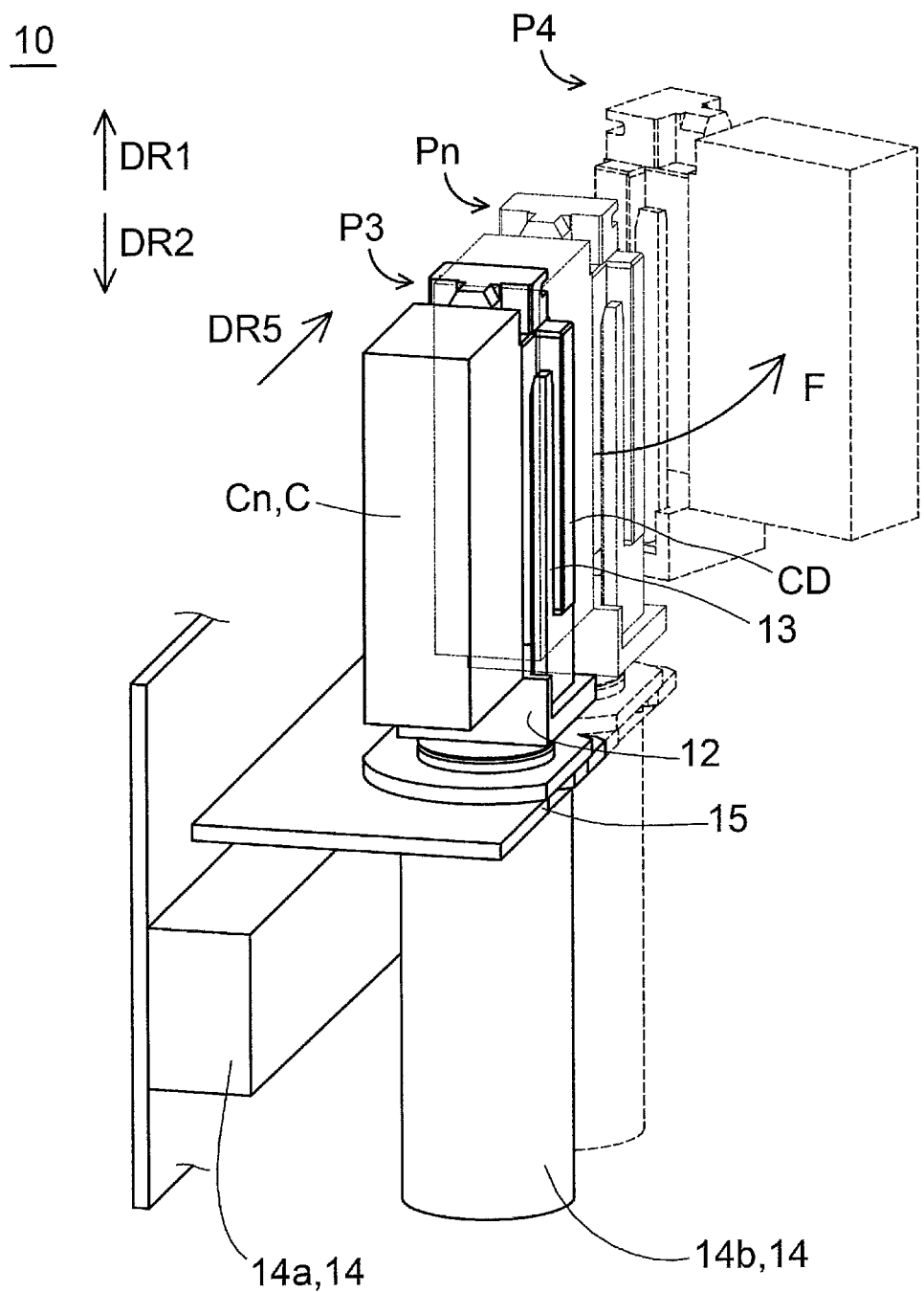
FIG. 9 is a schematic perspective view of an example of the jaw receiver.
Figure 10:
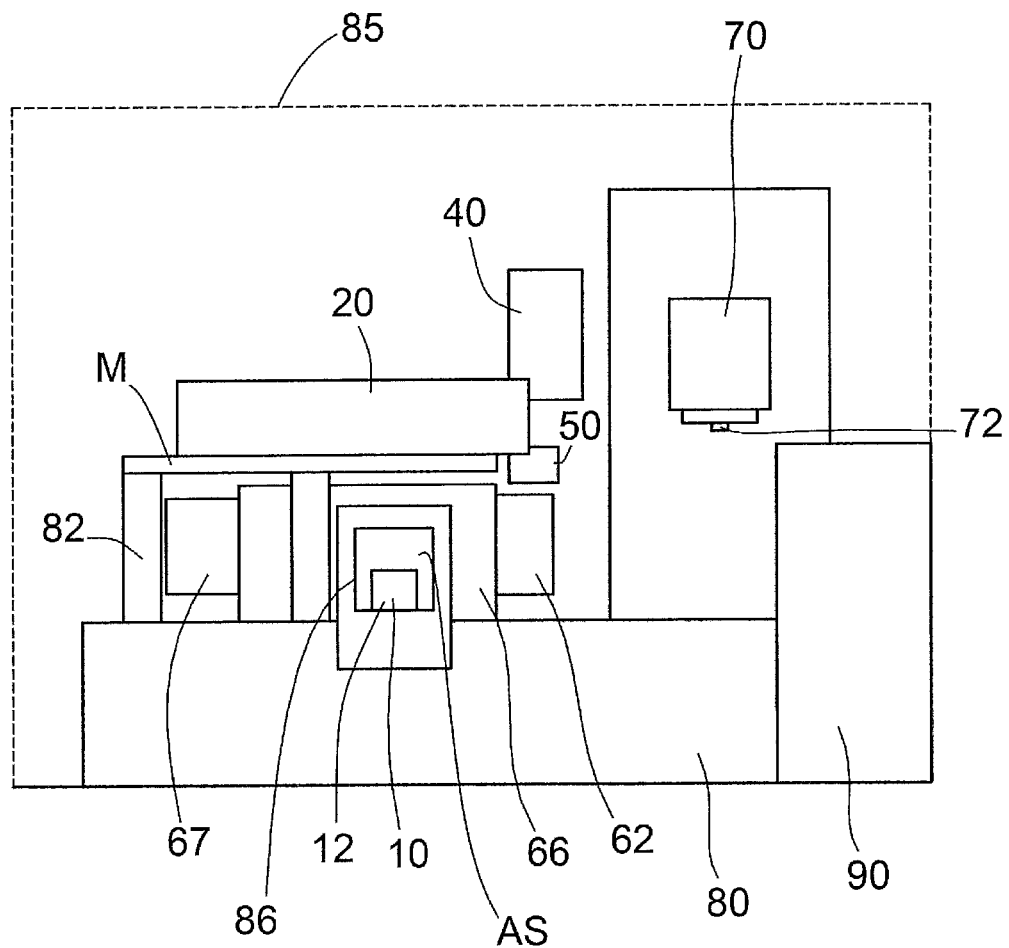
FIG. 10 is a schematic front view of the jaw exchanger and a machine tool according to the second embodiment, schematically illustrating an example arrangement of the jaw exchanger and the machine tool.

By referring to FIGS. 2 to 10, a jaw exchanger 1B and a machine tool 100B according to the second embodiment will be described. FIG. 2 is a schematic perspective view of the jaw exchanger 1B according to the second embodiment, schematically illustrating the jaw exchanger 1B. FIG. 3 is a schematic enlarged front view of the jaw exchanger 1B in which the jaw exchanger 1B is partially enlarged. FIGS. 4 to 6 are schematic plan views of the jaw exchanger 1B according to the second embodiment, schematically illustrating the jaw exchanger 1B. FIG. 7 is a schematic front view of the jaw exchanger 1B according to the second embodiment, schematically illustrating the jaw exchanger 1B. FIG. 8 is a schematic enlarged front view of the jaw exchanger 1B in which the jaw exchanger 1B is partially enlarged. FIG. 9 is a schematic perspective view of an example of the jaw receiver 10. FIG. 10 is a schematic front view of the jaw exchanger 1B and the machine tool 100B according to the second embodiment, schematically illustrating an example arrangement of the jaw exchanger 1B and the machine tool 100B. It is to be noted that FIG. 4 illustrates a state in which the stocker 20 is provided at the second position P2, that FIG. 5 illustrates a state in which the stocker 20 is provided at a position (intermediate position Pm) between the second position P2 and the first position P1, and that FIG. 6 illustrates a state in which the stocker 20 is provided at the first position P1. It is to be noted that in FIGS. 4 to 7, some elements of the jaw exchanger 1B are omitted. For example, while FIGS. 4 to 6 illustrate a region AR, in which the jaw receiver 10 is provided, the jaw receiver 10 itself is not illustrated in FIGS. 4 to 6. Also in FIG. 7, the jaw receiver 10 is not illustrated.

In the second embodiment, the following description will mainly focus on those respects in which this embodiment is different from the first embodiment. That is, those respects already described in the first embodiment will not be described in the second embodiment to avoid redundancy. Thus, it will be readily appreciated that those respects that are not explicitly described in the second embodiment but are described in the first embodiment apply in the second embodiment.

The jaw exchanger 1B according to the second embodiment includes the stocker 20, the stocker movement mechanism M, and the jaw transferor 40. The jaw exchanger 1B may include the jaw receiver 10. General configurations and functions of the stocker 20, the stocker movement mechanism M, the jaw transferor 40, and the jaw receiver 10 are as described in the first embodiment. In light of this, general configurations and functions of these elements will not be described where describing them is deemed redundant.

Stocker 20

By referring to FIG. 2, an example of the stocker 20 will be described. In the example illustrated in FIG. 2, the stocker 20 includes a plurality of jaw holders 21, an endless chain 23, and a chain driver 24.

Each of the plurality of jaw holders 21 is capable of holding a jaw C. More specifically, each of the jaw holders 21 is engageable with a jaw C. For example, a jaw holder 21 and a jaw C can be engaged with each other by: positioning the jaw holder 21 and the jaw C relative to each other in plan view; and moving the jaw C along a vertical direction (for example, moving the jaw C upward). Also, the jaw holder 21 and the jaw C can be disengaged with each other by moving the jaw C held by the jaw holder 21 along a vertical direction (for example, moving the jaw C downward).

In the example illustrated in FIG. 2, the stocker 20 includes 30 jaw holders 21 (two jaw holders are hidden behind the jaw transferor 40). It is to be noted, however, that the number of jaw holders 21 provided in the stocker 20 will not be limited to 30.

The plurality of jaw holders 21 are supported by the endless chain 23 circularly movably. The endless chain 23 is driven by the chain driver 24.

In the example illustrated in FIG. 2, the chain driver 24 includes a motor 24a and a first sprocket 24b, which is driven by the motor 24a. In the example illustrated in FIG. 2, the first sprocket 24b and a second sprocket 25b are engaged with the endless chain 23.

In the example illustrated in FIG. 2, the direction from the first sprocket 24b toward the second sprocket 25b (or the direction from the second sprocket 25b toward the first sprocket 24b) corresponds to the longitudinal direction of the stocker 20.

Jaw C

In the example illustrated in FIG. 2, three jaws C are attached to the chuck body 62. In other words, the chuck body 62 holds a workpiece via one set of jaws made up of three jaws C.

In the configuration in which one set of jaws is made up of three jaws C, the three jaws constituting the one set are preferably held by three jaw holders 21 arranged in a row in the jaw holder circulation direction.

In the example illustrated in FIG. 2, each jaw C includes: a contact surface CA, on which the jaw C contacts the workpiece; a base end portion CB, at which the jaw C is the held by the chuck body 62; and an engagement portion CC (see FIG. 3), at which the jaw C is engageable with an engagement member of the jaw transferor 40. The base end portion CB has a shape complementary to a groove of the chuck body 62. During the work of attaching the jaw C to the chuck body 62 (or during the work of removing the jaw C from the chuck body 62), the base end portion CB of the jaw C is guided by the groove of the chuck body 62.

Stocker Movement Mechanism M

By referring to FIGS. 4 to 7, the stocker movement mechanism M will be described. The stocker movement mechanism M is a mechanism capable of moving the stocker 20 between the first position P1 and the second position P2 via the intermediate position Pm.

As described in the first embodiment, the first position P1 (see FIG. 6) corresponds to: the jaw receiving position, where the stocker 20 receive a jaw Cn from the jaw receiver 10 (the jaw receiver 10 provided in the region AR); or the jaw pick-out position, where a jaw C is picked out from the stocker 20 to the jaw receiver 10.

The intermediate position Pm (see FIG. 5) is a position located between the first position P1 and the second position P2, and corresponds to a position of the stocker 20 corresponding to a time between the time when the stocker 20 started moving and the time when the stocker 20 finishes moving.

As described in the first embodiment, the second position P2 (see FIG. 4) corresponds to the jaw exchange position. More specifically, the second position P2 corresponds to the position where a jaw C attached to the chuck body 62 is retrieved to the stocker 20. The second position P2 also corresponds to the position where a jaw C stored in the stocker 20 is supplied to the chuck body 62.

In the examples illustrated in FIGS. 4 and 5, the stocker movement mechanism M includes a first movement mechanism M1. The first movement mechanism M1 is a mechanism that swings the stocker 20 between the first angle position AP1 (see FIG. 5) and the second angle position AP2 (see FIG. 4). An example of the first angle position AP1 is an angle position where the longitudinal direction of the stocker 20 is inclined relative to the rotation axis AX of the chuck body 62. An example of the second angle position AP2 is an angle position where the longitudinal direction of the stocker 20 is parallel to the rotation axis AX of the chuck body 62.

The first movement mechanism M1 includes: a pin member defining the swing axis AX1; and the driver 31 (see FIG. 7), which causes the stocker 20 to rotate about the swing axis AX1. The driver 31 may be a motor or an actuator (for example, a hydraulic actuator). An example of the swing axis AX1 is an axis parallel to a vertical direction. In the example illustrated in FIG. 4, the swing axis AX1 is provided in a region in which the second end portion 20b of the stocker 20 is provided.

In the example illustrated in FIG. 4, the second angle position AP2 corresponds to the second position P2. In the example illustrated in FIG. 5, the first angle position AP1 corresponds to the intermediate position Pm. It is to be noted that the first angle position AP1 also corresponds to the first position P1 (see FIG. 6).

Effects that the stocker movement mechanism M provides by including the first movement mechanism M1 (in other words, mechanism that swings the stocker 20) are as described in the first embodiment. In light of this, these effects will not be described where describing them is deemed redundant.

In the examples illustrated in FIGS. 4 and 5, when the stocker 20 swings about the swing axis AX1, the amount of displacement of the first end portion 20a of the stocker 20 is small in the directions along the rotation axis AX. Because of this configuration, the amount of withdraw of the stocker 20 in the directions along the rotation axis AX may be insufficient at the intermediate position Pm illustrated in FIG. 5. In light of this, the stocker movement mechanism M preferably includes a second movement mechanism (or second mover) M2, in addition to the first movement mechanism M1. The second movement mechanism M2 is capable of linearly moving the stocker 20 relative to the chuck body 62.

In the examples illustrated in FIGS. 5 and 6, the second movement mechanism M2 is capable of linearly moving the stocker 20 in the directions along the rotation axis AX of the chuck body 62. More specifically, the second movement mechanism M2 moves the stocker 20 between the intermediate position Pm (see FIG. 5) and the first position P1 (see FIG. 6).

The second movement mechanism M2 includes a second driver 32 (see FIG. 7). The second movement mechanism M2 may include a guide member 33 (see FIG. 5) and a slider 34.

The second driver 32 moves the stocker 20 along the guide member 33 (for example, a guide rail). In the example illustrated in FIG. 5, the slider 34 of the second movement mechanism M2 is linearly movable relative to the guide member 33, and the stocker 20 is supported by the slider 34.

The slider 34 and the second driver 32, which moves the stocker 20 supported by the slider 34, may be motors or actuators (for example, hydraulic actuators).

In the examples illustrated in FIGS. 4 to 7, the stocker movement mechanism M includes: the first movement mechanism M1, which is capable of swinging the stocker 20; and the second movement mechanism M2, which is capable of linearly moving the stocker 20. This configuration ensures that the stocker 20 moves in a smaller volume of space, and enables the first end portion 20a to take a larger movement stroke than the movement stroke that the second end portion 20b of the stocker 20 takes. Additionally, the above configuration increases the amount of withdraw of the stocker 20 in the directions along the rotation axis AX of the chuck body 62.

It is to be noted that in the second embodiment, the stocker movement mechanism M may include only one of the first movement mechanism M1, which is capable of swinging the stocker 20, and the second movement mechanism M2, which is capable of linearly moving the stocker 20. It is also to be noted that the stocker movement mechanism M may include two movement mechanisms capable of linearly moving the stocker 20. For example, the stocker movement mechanism M may include: a movement mechanism that moves the stocker 20 in a direction parallel to the rotation axis AX of the chuck body 62; and a movement mechanism that moves the stocker 20 in a direction perpendicular to the rotation axis AX.

Support Structure for Stocker 20

In the example illustrated in FIG. 7, the stocker 20 is provided above the support member 66, which rotatably supports the chuck body 62. Also, the stocker 20 is supported by a base 80 without intervention by the support member 66. The base 80 is provided below the support member 66.

In the configuration in which the stocker 20 is supported by the base 80 without intervention by the support member 66, vibration involved with the operation of the stocker 20 (for example, driving of the endless chain 23) is less likely to be transmitted to the support member 66. This eliminates or minimizes degradation of workpiece machining accuracy even if a workpiece held by the chuck body 62 is machined while at the same time a jaw Cn from the jaw receiver 10 is stored in the stocker 20.

It is to be noted that in the example illustrated in FIG. 7, a structure member 82 is fixed to the base 80, and the stocker 20 is mounted on the structure member 82 via the stocker movement mechanism M. The structure member 82 is preferably provided around the support member 66, which rotatably supports the chuck body 62. Also, the structure member 82 is preferably not in direct contact with the support member 66.

In the example illustrated in FIG. 7, the support member 66, which rotatably supports the chuck body 62, and the structure member 82 are fixed to the same base 80. Alternatively, the support member 66 may be fixed to a base that is different from the base 80 to which the structure member 82 is fixed.

Jaw Transferor 40

By referring to FIGS. 2 and 3, the jaw transferor 40 will be described. In the example illustrated in FIG. 2, the jaw transferor 40 is mounted on the stocker 20 via elements such as a bracket 41. This configuration ensures that when the stocker 20 moves from the first position P1 to the second position P2, the jaw transferor 40 also moves from the first position P1 to the second position P2.

In the example illustrated in FIG. 2, the jaw transferor 40 includes: an engagement member 42, which is engageable with the engagement portion CC of the jaw C; and a third driver 44, which moves the engagement member 42.

In the example illustrated in FIG. 3, the third driver 44 includes a linear movement driver 440, which linearly moves the engagement member 42. By linearly moving the engagement member 42, the linear movement driver 440 linearly moves the jaw C engaged with the engagement member 42. Examples of the linear movement driver 440 include a motor and an actuator (such as an electric actuator and a hydraulic actuator). In the example illustrated in FIG. 3, the linear movement driver 440 moves the engagement member 42 along the first direction DR1 or the third direction DR3 (more specifically, a vertical direction).

In the example illustrated in FIG. 3, the third driver 44 includes a rotational movement driver 445, which rotationally moves the engagement member 42. By rotating the engagement member 42 about the rotation axis AX2, the rotational movement driver 445 makes the engagement member 42 engaged with the engagement portion CC of the jaw C. Also by rotating the engagement member 42 about the rotation axis AX2, the rotational movement driver 445 makes the engagement member 42 disengaged with the engagement portion CC of the jaw C.

In the example illustrated in FIG. 3, a fixed portion 440a of the linear movement driver 440 is fixed to elements such as the bracket 41. Also, a movable member 43 (for example, movable block) is mounted on a movable portion 440b of the linear movement driver 440. Also, the rotational movement driver 445 is mounted on the movable member 43. The rotational movement driver 445 supports the engagement member 42 rotatably about the rotation axis AX2.

In the configuration in which the jaw transferor 40 includes the rotational movement driver 445, the engagement member 42 and the engagement portion CC of the jaw C are engaged (or disengaged) with each other more quickly. Also, in the configuration in which the jaw transferor 40 includes the linear movement driver 440, the jaw C is linearly moved more stably.

Guide Block 50

From the viewpoint of linearly moving the jaw C more stably and accurately, the jaw exchanger 1B preferably includes a guide block 50, as exemplified in FIG. 2.

The guide block 50 guides the linear movement of the jaw C in a region between the stocker 20 and the chuck body 62. The guide block 50 also guides the linear movement of the jaw C in a region between the stocker 20 and the jaw receiver 10.

In the example illustrated in FIG. 2, the guide block 50 is mounted on the stocker 20. Also, the guide block 50 is provided at a position opposite to the jaw transferor 40 relative to the stocker 20. More specifically, in the example illustrated in FIG. 2, the jaw transferor 40 is provided above the stocker 20, and the guide block 50 is provided below the stocker 20. In the example illustrated in FIG. 2, when the stocker 20 is provided at the second position P2, the guide block 50 is provided between the stocker 20 (more specifically, the first end portion 20a of the stocker 20) and the chuck body 62.

In the example illustrated in FIG. 2, the guide block 50 has a groove 51, along which the base end portion CB of the jaw C is guided. The extending direction in which the groove 51 extends is a direction parallel to the third direction DR3 (more specifically, a vertical direction).

In the example illustrated in FIG. 8, the guide block 50 includes a manipulation mechanism G, which manipulates a lock release member 620, which is provided on the chuck body 62. The manipulation mechanism G includes, for example: a pressing member 53, which is capable of pressing the lock release member 620; and a fourth driver 55, which moves the pressing member 53. An example of the fourth driver 55 is a motor or an actuator.

If the pressing member 53 presses the lock release member 620, the state of lock between the chuck body 62 and the jaw C (in other words, the state of fixing) is released. If the state of lock is released, the jaw transferor 40 is able to pull the jaw C from the chuck body 62. Also while the pressing member 53 is pressing the lock release member 620, the jaw transferor 40 is able to attach a new jaw C to the chuck body 62.

Jaw Receiver 10

In the example illustrated in FIG. 9, the jaw receiver 10 includes: the holder 12, which is capable of holding the jaw C; and a holder driver 14 (fifth driver), which moves the holder 12.

In the example illustrated in FIG. 9, the holder 12 includes an engagement portion 13, which is engageable with the protrusion CD of the jaw C. The engagement portion 13 is preferably an engagement portion that permits the jaw C to move relative to the holder 12 in a direction parallel to the first direction DR1. Also, the engagement portion 13 is preferably an engagement portion that prohibits the jaw C from moving relative to the holder 12 in directions other than the directions parallel to the first direction DR1.

The holder driver 14 moves the holder 12 between a third position P3 and a fourth position P4 via an intermediate position Pn (intermediate position).

The third position P3 corresponds to a position where the holder 12 receives a jaw Cn from a worker or a robot (or a position where a worker or a robot picks out the jaw C from the holder 12). The intermediate position Pn corresponds to a position between the third position P3 and the fourth position P4, in other words, corresponds to a position of the holder 12 corresponding to a time between the time when the holder 12 started moving and the time when the holder 12 finishes moving. The fourth position P4 corresponds to a position where the jaw transferor 40 picks out the jaw Cn from the holder 12 (or a position where the holder 12 receives the jaw C from the jaw transferor 40). Upon the holder 12's arrival to the fourth position P4 and the stocker 20's arrival to the first position P1, the holder 12 and the stocker 20 (more specifically, the jaw receiving member 21a of the stocker 20) are automatically subjected to positioning relative to each other. Upon the holder 12's arrival to the fourth position P4 and the stocker 20's arrival to the first position P1, the holder 12 and the jaw transferor 40 are automatically subjected to positioning relative to each other.

The direction from the holder 12 provided at the fourth position P4 toward the stocker 20 provided at the first position P1 (more specifically, the first end portion 20a of the stocker 20) is parallel to the first direction DR1 (more specifically, a vertical direction). This configuration ensures that the jaw transferor 40 only has to move the jaw Cn in the first direction DR1 (more specifically, perpendicularly upward), which is the direction from the holder 12 toward the stocker 20, in order to store the jaw Cn in the stocker 20.

The third position P3 is a position closer to the housing 85 (more specifically, the access opening AS) than the fourth position P4 is to the housing 85. This configuration enables a worker or a robot to easily access the holder 12 provided at the third position P3. It is to be noted that the direction from the holder 12 provided at the third position P3 toward the stocker 20 provided at the first position P1 (more specifically, the first end portion 20a of the stocker 20) is non-parallel to the first direction DR1 (more specifically, a vertical direction).

In the example illustrated in FIG. 9, the jaw receiver 10 includes the holder 12 and the holder driver 14, which moves the holder 12. This configuration makes the position or posture of the holder 12 adjustable to a position or a posture at which the holder 12 is more easily accessible from a worker or a robot. The above configuration also makes the position or posture of the holder 12 adjustable to a position or a posture at which the holder 12 is more easily accessible from the jaw transferor 40.

In the example illustrated in FIG. 9, the holder driver 14 is capable of adjusting the position of the holder 12, and is capable of adjusting the posture of the holder 12 (for example, orientation of the holder 12).

In the example illustrated in FIG. 9, the holder driver 14 includes: a linear movement driver 14a, which linearly moves the holder 12; and a swing movement driver 14b, which swings the holder 12 about a swing axis.

A non-limiting example of the linear movement driver 14a is a motor or an actuator. The linear movement driver 14a is capable of linearly moving the holder 12 in a direction away from the housing 85 of the machine tool 100B (more specifically, the fifth direction DR5). It will be assumed that a worker or a robot has placed a jaw Cn on the holder 12 (see the solid lines illustrated in FIG. 9). In this case, the linear movement driver 14a moves the holder 12 in the fifth direction DR5, thereby moving the holder 12 and the jaw Cn held by the holder 12 from the third position P3 to the intermediate position Pn (see the two-dot chain lines illustrated in FIG. 9).

An example of the swing movement driver 14b is a motor or an actuator. The swing movement driver 14b is capable of swinging the holder 12 about a swing axis. By swinging the holder 12, the posture of the jaw Cn held by the holder 12 (more specifically, the orientation of the jaw Cn) is adjusted. It will be assumed that the holder 12 holding the jaw Cn is provided at the intermediate position Pn (see the two-dot chain lines illustrated in FIG. 9). In this case, the swing movement driver 14b swings the holder 12 (see arrow F), thereby moving the holder 12 and the jaw Cn held by the holder 12 from the intermediate position Pn to the fourth position P4 (see the broken lines illustrated in FIG. 9).

In the configuration in which the jaw receiver 10 includes the swing movement driver 14b, the posture of the jaw C held by the holder 12 is adjustable between: a first posture, at which the jaw C is easily handleable by a worker or a robot; and a second posture, at which the jaw C is acceptable by the stocker 20 or the jaw transferor 40.

In the example illustrated in FIG. 9, the swing movement driver 14b is fixed to a bracket 15. Also, the holder 12 is supported by the bracket 15 rotatably relative to the bracket 15.

In the example illustrated in FIG. 9, a movable portion of the linear movement driver 14a is connected to the bracket 15 so that when the linear movement driver 14a moves the bracket 15, the swing movement driver 14b and the holder 12 supported by the bracket 15 are linearly moved.

In the example illustrated in FIG. 9, the holder driver 14 includes the linear movement driver 14a and the swing movement driver 14b. Alternatively, the holder driver 14 may include only one of the linear movement driver 14a and the swing movement driver 14b.

Machine Tool 100B

In the example illustrated in FIG. 10, the machine tool 100B includes, in addition to the jaw exchanger 1B: the chuck body 62; the support member 66, which rotatably supports the chuck body 62; a rotational movement driver 67, which rotates the chuck body 62 about the rotation axis AX; the machining apparatus 70, to which the tool 72 is attachable; the housing 85 (the housing 85 surrounds the jaw exchanger 1B, the chuck body 62, the support member 66, the rotational movement driver 67, and the machining apparatus 70); and the controller 90.

In the example illustrated in FIG. 10, the jaw receiver 10 is provided at a position where the jaw receiver 10 is accessible by a worker or a robot through the access opening AS, which is provided on the housing 85. The jaw receiver 10 or the access opening AS is lower in height than, for example, the stocker 20. Also, the jaw receiver 10 or the access opening AS is approximately equal in height to, for example, the chuck body 62.

The jaw receiver 10 is provided at a position where the jaw receiver 10 is closer to the housing 85 than the chuck body 62 or the support member 66 is to the housing 85. The jaw receiver 10 is preferably provided in a region in which the front surface of the machine tool 100B is provided.

The housing 85 is preferably provided with a door 86 (for example, a door provided with a transparent window), with which the access opening AS is openable and closable. When the door 86 is in open state, a worker or a robot is able to access the jaw receiver 10 through the access opening AS. When the door 86 is in closed state, the jaw transferor 40 is able to access the jaw receiver 10.

In the example illustrated in FIG. 2, the machine tool 100B includes a jaw chamber RM, which is connected to the access opening AS. The holder 12 provided at the third position P3 is positioned inside the jaw chamber RM.

Controller 90

The controller 90 controls the stocker 20 (more specifically, the chain driver 24 of the stocker 20), the stocker movement mechanism M, and the jaw transferor 40. The controller 90 may control the holder driver 14 of the jaw receiver 10 and/or the fourth driver 55 of the guide block 50. Also, the controller 90 may control the rotational movement driver 67, which rotates the chuck body 62. The controller 90 is connected to, in a control-signal transmittable manner, the stocker 20, the stocker movement mechanism M, the jaw transferor 40, the holder driver 14, and the fourth driver 55 of the guide block 50.

Method of Storing Jaw C

Figure 11:
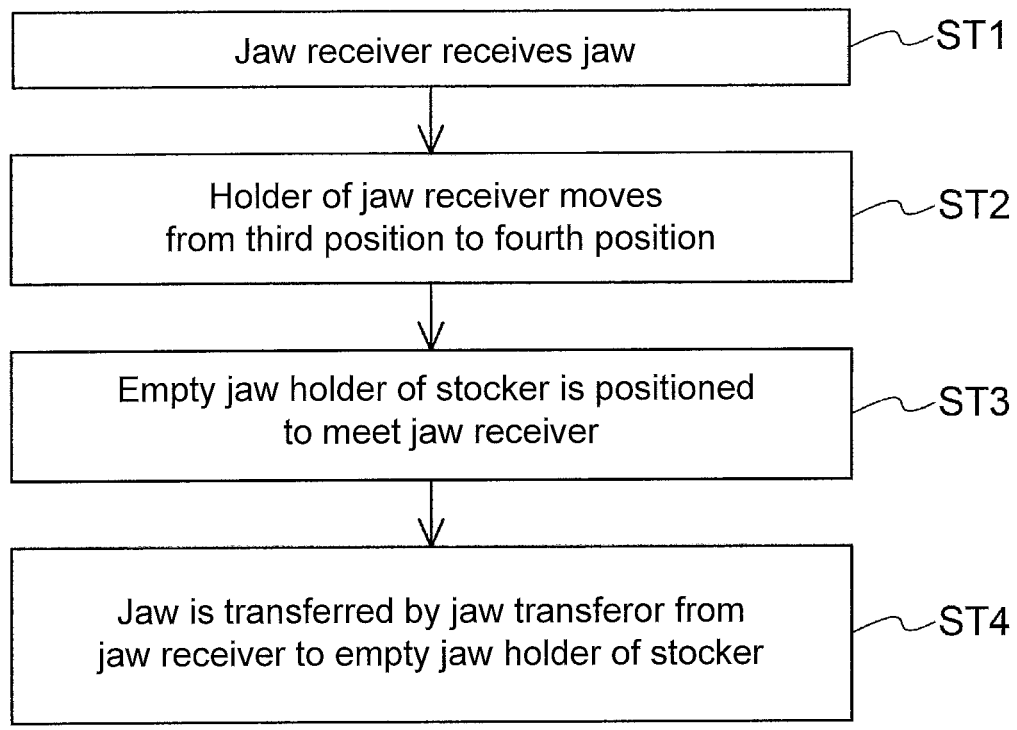
FIG. 11 is a flowchart of an example method of storing a jaw.

By referring to FIGS. 1 to 11, description will be made with regard to a method of storing a jaw Cn using the jaw exchanger 1 according to an embodiment. FIG. 11 is a flowchart of an example method of storing a jaw Cn. In this example, it will be assumed that the stocker 20 is already provided at the first position P1. It is to be noted that when the stocker 20 is not provided at the first position P1, the position of the stocker 20 is changed to the first position P1 by the end of third step ST3, described later.

At first step ST1, the jaw receiver 10 (more specifically, the holder 12) receives a jaw Cn from a worker or a robot.

At second step ST2, the holder 12 of the jaw receiver 10 moves from the third position P3 to the fourth position P4. The holder 12 is caused to move by the holder driver 14's receipt of a control signal from the controller 90, followed by the holder driver 14 moving the holder 12 based on the control signal that has been received. In the configuration in which the holder driver 14 includes the linear movement driver 14a, the movement of the holder 12 includes a linear movement of the holder 12. In the configuration in which the holder driver 14 includes the swing movement driver 14b, the movement of the holder 12 includes a swing movement of the holder 12. In the configuration in which the holder driver 14 includes the linear movement driver 14a and the swing movement driver 14b, the movement of the holder 12 includes a linear movement of the holder 12 and a swing movement of the holder 12.

It is to be noted that in the configuration in which the holder 12 is an unmovable holder, second step ST 2 is omitted.

At third step ST3, the chain driver 24 of the stocker 20 is driven so that the jaw receiving member 21a (empty jaw holder 21) of the stocker 20 is positioned to meet the jaw receiver 10 (more specifically, a position perpendicularly above the jaw receiver 10). The chain driver 24 is driven upon the chain driver 24's receipt of a control signal from the controller 90.

At fourth step ST4, the jaw Cn is transferred by the jaw transferor 40 from the jaw receiver 10 to the jaw receiving member 21a (empty jaw holder 21) of the stocker 20. The jaw Cn is transferred upon the third driver 44's (more specifically, the linear movement driver 440's and/or the rotational movement driver 445's) receipt of a control signal from the controller 90. More specifically, upon the linear movement driver 440's receipt of a control signal from the controller 90, the linear movement driver 440 moves the engagement member 42 in the second direction DR2. Next, upon the rotational movement driver 445's receipt of a control signal from the controller 90, the rotational movement driver 445 rotates the engagement member 42 about the rotation axis AX2. By this rotation, the engagement member 42 is brought into engagement with the engagement portion CC of the jaw Cn. Next, upon the linear movement driver 440's receipt of a control signal from the controller 90, the linear movement driver 440 moves the engagement member 42 in the first direction DR1. By this movement of the engagement member 42, the jaw Cn is moved in the first direction DR1 together with the engagement member 42. As a result, the jaw Cn is stored in the stocker 20.

Through the steps described above, the jaw Cn is stored in the stocker 20. It is to be noted that it is not necessary for the worker to enter the machine tool 100 during first step ST1 through fourth step ST4. Therefore, it is not necessary to suspend machining of a workpiece performed by the machine tool 100 in order to perform the above-described method of storing a jaw. Also, the transfer of the jaw Cn from the jaw receiver 10 to the stocker 20 is a linear transfer performed by the jaw transferor 40. This ensures that the jaw Cn is transferred stably in a short period of time.

Method of Exchanging Jaw C

By referring to FIGS. 1 to 10 and 12, description will be made with regard to a method of exchanging a jaw C performed using the jaw exchanger 1 according to an embodiment. FIG. 12 is a flowchart of an example method of exchanging a jaw C. In this example, it will be assumed that the stocker 20 is provided at the first position P1 before the method of exchanging a jaw C is performed.

At first step ST101, the stocker 20 is moved from the first position P1 to the second position P2. The stocker 20 is moved upon the stocker movement mechanism M's receipt of a control signal from the controller 90, followed by the stocker movement mechanism M (more specifically, the first movement mechanism M1 and/or the second movement mechanism M2) moving the stocker 20 based on the control signal that has been received.

At second step ST102, the chain driver 24 of the stocker 20 is driven so that the jaw receiving member 21a (empty jaw holder 21) of the stocker 20 is positioned to meet the chuck body 62 (more specifically, positioned perpendicularly above the chuck body 62). The chain driver 24 is driven upon the chain driver 24's receipt of a control signal from the controller 90. Also at second step ST102, the chuck body 62 is rotated about the rotation axis AX so that the jaw C held by the chuck body 62 is provided at a removal position. An example of the removal position corresponds to a position where the jaw C to be retrieved is highest in position.

At third step ST103, the jaw C is transferred by the jaw transferor 40 from the chuck body 62 to the jaw receiving member 21a (empty jaw holder 21) of the stocker 20. The jaw C is transferred upon the third driver 44's (more specifically, the linear movement driver 440's and/or the rotational movement driver 445's) receipt of a control signal from the controller 90. By performing third step ST103, the jaw C attached to the chuck body 62 is retrieved to the stocker 20.

Second step ST102 and third step ST103 are performed by a number equivalent to the number of jaws C intended to be retrieved from the chuck body 62. For example, the number of jaws C intended to be retrieved from the chuck body 62 is three, second step ST102 and third step ST103 are performed three times.

At fourth step ST104, the chain driver 24 of the stocker 20 is driven so that a jaw supplier of the stocker 20 (the jaw holder 21 holding the jaw C) is positioned to meet the chuck body 62 (more specifically, positioned perpendicularly above the chuck body 62). The chain driver 24 is driven upon the chain driver 24's receipt of a control signal from the controller 90. Also at fourth step ST104, the chuck body 62 is rotated about the rotation axis AX so that the groove of the chuck body 62 (the groove to receive the jaw C) is provided at an attachment position. An example of the attachment position corresponds to a position where the groove of the chuck body 62 faces upward.

At fifth step ST105, the jaw C is transferred by the jaw transferor 40 from the jaw supplier of the stocker 20 (the jaw holder 21 holding the jaw C) to the chuck body 62. The jaw C is transferred upon the third driver 44's (more specifically, the linear movement driver 440's and/or the rotational movement driver 445's) receipt of a control signal from the controller 90. By performing fifth step ST105, the jaw C is attached to the chuck body 62.

Fourth step ST104 and fifth step ST105 are performed by a number equivalent to the number of jaws C intended to be attached to the chuck body 62. For example, when the number of jaws C intended to be attached to the chuck body 62 is three, fourth step ST104 and fifth step ST105 are performed three times.

At sixth step ST106, the stocker 20 is moved from the second position P2 to the first position P1. The stocker 20 is moved upon the stocker movement mechanism M's receipt of a control signal from the controller 90, followed by the stocker movement mechanism M (more specifically, the first movement mechanism M1 and/or the second movement mechanism M2) moving the stocker 20 based on the control signal that has been received.

Through the steps described above, the jaw C attached to the chuck body 62 is exchanged.

The present invention will not be limited to the above-described embodiments; it will be appreciated that the embodiments may be modified or changed in any manner deemed convenient within the technical spirit and scope of the present invention. It will also be appreciated that the various kinds of technology and/or technique used in the embodiments are applicable to the other embodiments unless a technical contradiction occurs. Further, it will be appreciated that the optional configurations in each embodiment may be omitted if deemed necessary.

For example, in the above-described embodiments, the machine tool 100 is described as including a single the jaw exchanger 1. Alternatively, the machine tool 100 may include two or more jaw exchangers. For example, in the configuration in which the machine tool includes a plurality of workpiece holders (in other words, a plurality of chuck bodies 62), the machine tool may include a number of jaw exchangers equivalent to the number of the workpiece holders. Alternatively, a single jaw exchanger may be shared among a plurality of workpiece holders.

Also in the above-described embodiments, there is no particular limitation to the size of the jaw storable in the stocker 20. In other words, the jaw exchanger according to the above-described embodiments may be used to exchange jaws of any sizes. Also in the above-described embodiments, the structure or the shape of the contact surface CA of one jaw C storable in the stocker 20 may be identical to or different from the structure or the shape of the contact surface CA of another jaw C storable in the stocker 20.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A jaw exchanger comprising:
   a stocker configured to store jaws which are configured to be attached to a chuck body of a machine tool, the chuck body being rotatable about a rotation axis;
   a stocker mover configured to move the stocker between a first stocker position and a second stocker position; and
   a jaw transferor configured to transfer the jaws from a jaw receiver to the stocker when the stocker is positioned at the first stocker position, and the jaw transferor is configured to transfer the jaws from the stocker to the chuck body when the stocker is positioned at the second stocker position,
   wherein, when the stocker is provided at the first stocker position, the jaw transferor does not overlap the chuck body in plan view, and
   wherein the jaw transferor is mounted on the stocker.

2. The jaw exchanger according to claim 1, wherein the jaw transferor is movable together with the stocker to
   a first jaw transferor position at which the jaw transferor is configured to transfer the jaws from the jaw receiver to the stocker when the stocker is positioned at the first stocker position, and
   a second jaw transferor position at which the jaw transferor is configured to transfer the jaws from the stocker to the chuck body when the stocker is positioned at the second stocker position.

3. The jaw exchanger according to claim 2, wherein the chuck body is rotatably supported via a support member, the stocker is provided above the support member in a height direction of the machine tool.

4. The jaw exchanger according to claim 3, wherein the stocker is supported by a base not via the support member, the base being provided below the support member in the height direction.

5. The jaw exchanger according to claim 2, wherein the stocker mover comprises a first mover configured to rotate the stocker around a swing axis between a first angle position and a second angle position.

6. The jaw exchanger according to claim 1, wherein the chuck body is rotatably supported via a support member, the stocker is provided above the support member in a height direction of the machine tool.

7. The jaw exchanger according to claim 6, wherein the stocker mover comprises a first mover configured to rotate the stocker around a swing axis between a first angle position and a second angle position.

8. The jaw exchanger according to claim 1, wherein the stocker mover comprises a first mover configured to rotate the stocker around a swing axis between a first angle position and a second angle position.

9. The jaw exchanger according to claim 8, wherein the stocker mover comprises a second mover configured to move the stocker linearly.

10. The jaw exchanger according to claim 1, wherein the jaw receiver is provided such that the jaw receiver receives the jaws from outside the machine tool.

11. The jaw exchanger according to claim 10, wherein the stocker positioned at the first stocker position and the jaw receiver are provided along a vertical direction.

12. The jaw exchanger according to claim 10, wherein the jaw receiver comprises
    a holder configured to hold the jaws, and
    a holder driver configured to move the holder between a third position and a fourth position, the third position being a position such that the holder receives the jaws from outside the machine tool, the fourth position being a position such that the jaws are transferred from the holder to the stocker.

13. The jaw exchanger according to claim 1, wherein the stocker mover comprises a first mover configured to rotate the stocker around a swing axis between a first angle position and a second angle position, the jaw transferor being located next to the jaw receiver and away from the chuck body when the stocker is at the first angle position, and the jaw transferor being located next to the chuck body and away from the jaw receiver when the stocker is at the second angle position.

14. A machine tool comprising:
a chuck body configured to hold a workpiece via jaws;
a support member rotatably supporting the chuck body;
a jaw exchanger according to claim 1 and further comprising:
the jaw receiver, wherein the jaw receiver is configured to receive the jaws; and
a controller configured to control the jaw exchanger.

15. The machine tool according to claim 14, further comprising:
a machiner configured to machine the workpiece.

16. The machine tool according to claim 15, further comprising:
a housing surrounding the jaw exchanger, the chuck body, the support member, and the machiner, wherein the jaw receiver is provided such that the jaw receiver is accessible through an access opening provided in the housing.

17. The machine tool according to claim 16, wherein the access opening is provided on a front surface of the housing.

18. A jaw exchanger comprising:
a stocker configured to store jaws which are configured to be attached to a chuck body of a machine tool, the chuck body being rotatable about a rotation axis;
a stocker mover configured to move the stocker between a first position and a second position; and
a jaw transferor configured to transfer the jaws from a jaw receiver to the stocker when the stocker is positioned at the first position, and the jaw transferor is configured to transfer the jaws from the stocker to the chuck body when the stocker is positioned at the second position,
wherein the chuck body is rotatably supported via a support member, the stocker is provided above the support member in a height direction of the machine tool,
wherein the stocker is supported by a base not via the support member, the base being provided below the support member in the height direction, and
wherein the jaw transferor is mounted on the stocker.

19. The jaw exchanger according to claim 18, wherein the stocker mover comprises a first mover configured to rotate the stocker around a swing axis between a first angle position and a second angle position.

20. A jaw exchanger comprising:
a stocker configured to store jaws which are configured to be attached to a chuck body of a machine tool, the chuck body being rotatable about a rotation axis;
a stocker movement mechanism configured to move the stocker between a first position and a second position; and
a jaw transferor configured to transfer the jaws from a jaw receiver to the stocker when the stocker is positioned at the first position, and the jaw transferor is configured to transfer the jaws from the stocker to the chuck body when the stocker is positioned at the second position,
wherein the stocker movement mechanism comprises a first mover configured to rotate the stocker around a swing axis between a first angle position and a second angle position,
wherein the first angle position is an angle position where a longitudinal direction of the stocker which passes through the swing axis is inclined relative to the rotation axis, and
wherein the second angle position is an angle position where the longitudinal direction is substantially parallel to the rotation axis.

* * * * *